United States Patent
Haraguchi et al.

(10) Patent No.: US 6,295,117 B2
(45) Date of Patent: *Sep. 25, 2001

(54) PRINTING APPARATUS AND PRINTING SYSTEM

(75) Inventors: Tsuyoshi Haraguchi; Yutaka Ueda; Shigeharu Koboshi, all of Hino (JP)

(73) Assignee: Konica Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,471

(22) Filed: Apr. 14, 1999

(30) Foreign Application Priority Data

Apr. 16, 1998 (JP) ................................................. 10-106741

(51) Int. Cl.⁷ ............................ G03B 27/32; G03B 27/52
(52) U.S. Cl. ............................................. 355/40; 355/27
(58) Field of Search .................................. 355/40, 29, 39, 355/72, 27; 396/639; 358/455, 302, 204, 404; 362/127

(56) References Cited

U.S. PATENT DOCUMENTS

| | | | | |
|---|---|---|---|---|
| 5,319,401 | * | 6/1994 | Hicks | 354/76 |
| 5,576,795 | * | 11/1996 | Kurimoto et al. | 396/626 |
| 5,907,391 | * | 5/1999 | Kobayashi et al. | 355/40 |
| 5,935,217 | * | 8/1999 | Sakai et al. | 358/404 |
| 6,034,759 | * | 3/2000 | Enomoto | 355/41 |
| 6,038,034 | * | 3/2000 | Nishio et al. | 358/404 |

* cited by examiner

Primary Examiner—Russell Adams
Assistant Examiner—Hung Henry Nguyen
(74) Attorney, Agent, or Firm—Finnegan, Henderson, Farabow, Garrett, & Dunner, L.L.P.

(57) ABSTRACT

There is described a system for producing prints, which includes inputting device to input image data and information corresponding to the image data, a selector to select either a first mode or a second mode and a printer to print images on a recording medium. In the first mode, the system performs inputting operation of the image data and information corresponding to the image data in addition to a print producing operation. While in the second mode, the system performs the print producing operation on the basis of the image data and information corresponding to the image data, which are stored in a memory during the first mode.

15 Claims, 8 Drawing Sheets

PRINTING APPARATUS AND PRINTING SYSTEM

BACKGROUND OF THE INVENTION

The present invention relates to a printing apparatus and a printing system.

Conventionally, in some photofinishing shops, commonly called mini-labs, normal prints are produced by an operator's manual operation in accordance with the order of customers, in order to instantaneously deliver the prints to the customers. Recently, there has been well known a printing apparatus in which the original is photo-electrically read out to obtain image data, and a print is made based on the image data, or based on directly inputted image data (for example, image data by a CD-ROM or a communication line).

Incidentally, in the printing apparatus which produces prints based on the image data, the image data can be processed by using various image processing methods. Accordingly, sometimes, the customers request the following processings other than ordinary printing: for example, large-sized print formats which takes a long time period for image enlargement processing; layout print formats requiring rotation of the image or arrangement of the image; or specially processed print formats by which special effects are added to the print by conducting dodging or printing-in, or sharpness conversion processing of the image.

As described above, other than ordinary print format services, there are also special print format services. Generally, in these special print format services, there are many services requiring a long time period, therefore, sometimes these services interfere with the ordinary printing service which is to quickly deliver ordinary prints to customers. On the contrary, some customers feel it more convenient to receive their prints the next day, rather than on that day. In these cases, efficiency of the printing apparatus will be improved by continuous operation during, e.g., the operator's rest time or midnight. This fact would contribute to reduction of its production cost, since it becomes possible to intensively operate the printing apparatus during times of low power consumption and low energy charge.

In digital exposure methods in which a printing apparatus forms an image by exposing each pixel based on image data, it becomes possible to utilize the apparatus even during the operator's rest or non-duties time for continuous operation of the printing apparatus by applying the following steps: obtaining customer's order information which includes the image data and the order information corresponding to the image data; temporarily storing the image data and order information corresponding to the image data in a memory; and producing prints on the basis of the image data and order information corresponding to the image data stored in the memory. In this case, however, since the operator would not manually operate the printing apparatus, the printing apparatus should have automatic controlling functions described as follow: a printing control for obtaining a maximum number of prints without loss of recording mediums; a control for automatically stopping the printing operation; and a control for automatically stopping the temperature conditioner for the printing apparatus.

Further, a printing apparatus and a printing method in which a digital print is formed based on digital image data and the corresponding print order data, which are stored in a memory by a reception processing means, are set forth in Japanese Tokkaihei No. 10-78618. In this prior art, however, there is disclosed no method to effectively conduct the above-described printing operation while the ordinary printing operation is actually conducted. Therefore, improvement of the printing efficiency could not be attained by the prior art cited above.

SUMMARY OF THE INVENTION

The present invention is attained in view of the above-described situations, and the first object of the present invention is to effectively operate the printing apparatus in accordance with the operating conditions of it and printing service conditions; the second object of the present invention is to produce prints with stable voltage and at low cost by operating the printing apparatus during periods of low power consumption and consequent low energy charges, e.g., by operating the printing apparatus during the operator's rest time or midnight; and the third object of the present invention is to provide a printing apparatus and a printing system, by which prints can be automatically produced on the basis of the image data and the information corresponding to the image data stored in a memory.

To overcome the cited shortcomings, the abovementioned objects of the present invention can be attained by the following systems:

1) A system for producing prints, comprising:
   inputting means for inputting image data and information corresponding to the image data;
   a selector to select either a first mode or a second mode, in both of which the system produces the prints on the basis of the image data; and
   a printer to print images on recording mediums on the basis of the image data and the information.

2) A system for producing prints, comprising:
   inputting means for inputting image data and information corresponding to the image data;
   a memory to store the image data and the information inputted by the inputting means;
   a controller to control the system, by comparing the image data and the information with at least one of factors including an amount of recording mediums required for producing the prints on the basis of the image data, an amount of processing agents required for processing the recording mediums and an amount of water required for processing the recording mediums; and
   a printer to print images on the recording mediums on the basis of the image data and the information.

3) A system for producing prints, comprising:
   inputting means for inputting image data and information corresponding to the image data;
   a memory to store the image data and the information inputted by the inputting means;
   a printer to print images on recording mediums on the basis of the image data and the information;
   means for outputting a signal when the printer finishes printing the images; and
   a controller to control the system based on the signal.

4) A system for producing prints, comprising:
   inputting means for inputting image data and information corresponding to the image data;
   a memory to store the image data and the information;
   a printer to print images on the recording mediums on the basis of the image data and the information; and
   layout means for determining a layout of images arranged on the recording medium on the basis of a plurality of the image data and a plurality of the information.

Further, in order to solve the above-described problems and to attain the abovementioned objects, the following printing apparatus are desirable embodiments of the present invention.

(1) A printing apparatus in which, in the first mode, image data and the corresponding information are obtained, and based on the information, the image data corresponding to the information is selected into the image data to be printed in the first mode and into the image data not to be printed in the first mode, and a print is formed based on the image data selected to be printed; and in the second mode, a print is formed based on the image data selected not to be printed in the first mode .

According to the above apparatus, for example, during the daytime, as the first mode, the ordinary printing operation is mainly conducted by the operation of the operator, and a printing service is conducted to deliver the print to the customer at once, and for example, during a rest of the operator or night, as the second mode, a special printing operation based on the image processing requiring a long period of time is automatically operated without any operation of the operator, or the printing service is separately conducted to deliver the print to the customer on that day, or on the next day, that is, the printing apparatus can be separately used, t hereby, the printing apparatus can be effectively operated and the printing operation can be effectively carried out. Further, the operation can be concentrated during the time period of low power consumption and low energy charge, and the voltage is stable and the printing cost is decreased.

Further, for example, the ordinary printing and the special printing can be separately conducted, therefore, the number of replacement of the recording medium having the width for the ordinary print and the recording medium having, for example, the large width for the special print is reduced, and the useless consumption of sheets of paper due to photographic fog specifically generated on the leading edge of the photosensitive material photographic paper which is recording medium, can be suppressed to the minimum.

Incidentally, for switching between the first mode and the second mode, the following systems may be adopted: for example, a timer is set and the modes are switched at predetermined time; the modes are switched after the passage of a predetermined time period after receiving a signal (input)of the completion of the operation from the operator; or the modes are switched when a new printing operation is not started even after the passage of a predetermined time period.

(2) In the above apparatus, time periods for the first mode and the second mode are previously set.

In the above apparatus, time periods for the first mode and the second mode are previously set, therefore, for example, the switching between 'in order-reception' in the first mode and 'the completion of the order-reception' in the second mode is automatically conducted by timer setting, which is convenient.

(3) In the above apparatus, the first mode is the mode of the order-reception, and the second mode is the mode of completion of the order-reception.

In the above apparatus, because the first mode is the mode of the order-reception, and the second mode is the mode of completion of the order-reception, the printing apparatus can be effectively operated according to the condition of use of the printing apparatus and printing service conditions, therefore, when the printing apparatus is operated, for example, during a rest of the operator or night, the printing apparatus can be operated during a time period of low power consumption and low energy charge, thereby, voltage is stable, and a low cost print can be formed.

(4) An apparatus in which image data and the corresponding information are obtained, and the image data and the corresponding information are stored in a data storage means, and a print is formed based on the image data and the corresponding order information, stored in the data storage means, wherein the apparatus control is conducted by comparing the stored data to at least one of an amount of recording medium necessary for printing, an amount of processing agents necessary for processing the recording medium, or an amount of water necessary for processing the recording medium.

In the above apparatus, when the printing operation is started based on the image data and the corresponding information, stored in the data storage means, a necessary amount of recording medium, a necessary amount of processing agents for processing the recording medium and forming a print, and a necessary amount of water are presumed based on the stored data, and when any of these amounts is insufficient, replenishment is previously requested, or it is reported that to which extent the printing operation will be completed without any replenishment, thereby, a shortage of these amounts can be avoided during printing operation. After the printing operation is started, the apparatus can be controlled to stop the printing operation when any of the above amounts becomes short, thereby, printing sheets are prevented from being uselessly printed. In this case, it can be reported based on the stored data, to what extent the printing operation is not completed.

(5) A printing apparatus in which image data and the corresponding information are obtained, the image data and the corresponding information are stored in a data storage means, and a print is formed based on the image data and the corresponding information, stored in the data storage means, wherein the apparatus is controlled when the printing operation based on the stored data is completed.

In the above apparatus, the completion control of the printing apparatus itself is also conducted based on the completion of the printing operation based on the storage data, and a temperature conditioning operation or roller driving is automatically completed. Thereby, for example, power consumption is suppressed, deterioration of the apparatus is suppressed, or deterioration of processing solutions can be suppressed in an apparatus to form a print by development-processing the photographic photosensitive material by processing solutions.

(6) The above apparatus stores the image data in the data storage means by conducting data compression processing when the image data to be stored in the data storage means exceeds a predetermined amount.

In the above apparatus, the image data is stored in the data storage means by being subjected to data compression processing when the image data to be stored in the data storage means exceeds a predetermined amount, thereby, while deterioration of the image quality due to the data compression is suppressed to the minimum, more image data can be stored and printed.

(7) The above apparatus outputs a command to change the present recording medium to a predetermined sized-recording medium to form a print based on the image data and the corresponding information, stored in the data storage means, when the mode is switched from the first mode to the second one.

The above apparatus can require the replacement to the recording medium having the width printable in the maximum size which is necessary when a print is formed based on the stored data, thereby, stoppage of the printing operation due to discord of the size can be prevented.

(8) A printing apparatus in which a print is formed by arranging the image onto a predetermined sized-recording medium so as to reduce a margin, based on the image data and the corresponding information, stored in the data storage means.

In the above apparatus, when the image data is appropriately arranged on, for example, the recording medium having the large width, and the recording medium is cut to a predetermined size after the printing operation, even if the operator is not near the printing apparatus and the recording medium can not be changed to the recording medium having the different width, the amount of useless recording medium becomes minimum, and various sized-prints can be formed.

(9) The apparatus has a release means by which, after the change of the mode from the first one to the second one, the printing operation based on the image data which is not printed in the first mode, and the corresponding information, which are stored in the data storage means, is stopped once and the mode is returned to the first mode.

When, in the second mode, it is required to return to the first mode at once and to start again the printing operation 'in order-reception', the printing operation in the second mode is stopped once, and the mode is changed to the mode 'in order-reception' in the first mode and the print can be instantly formed. In this case, it is preferable for easy print control that the printing operation based on the stored data is stopped when the order is completed, rather than during the operation for each of customers.

(10) A printing system in which the image data and the corresponding information are obtained, the image data and the corresponding information are stored in the data storage means, and a print is formed based on the image data and the corresponding order information, stored in the storage means, wherein the printing apparatus is controlled by comparing the stored data to at least one of an amount of the recording medium necessary for printing, an amount of processing agents necessary for processing the recording medium, or an amount of water necessary for processing the recording medium.

In the above system, when the printing operation is started based on the image data and the corresponding information, which are stored in the data storage means, a necessary amount of recording medium, a necessary amount of processing agents for processing the recording medium and forming the print, and a necessary amount of water are presumed from the stored data, and when any of these amounts is insufficient, replenishment is previously requested, or it is reported that to which extent the printing operation will be completed without any replenishment, thereby, a shortage of such the amount can be avoided during printing operation. After the printing operation is started, the printing operation can be controlled to be stopped when any of the above amounts becomes short, thereby, printing paper is prevented from being uselessly printed. In this case, it can also be reported based on the stored data, to what extent the printing operation is not completed.

(11) A printing system in which the image data and the corresponding information are obtained, the image data and the corresponding information are stored in the data storage means, and a print is formed based on the image data and the corresponding information, stored in the storage means, wherein the printing apparatus is controlled when the printing operation based on the stored data is completed.

In the above system, the control of completion of the printing apparatus itself is also conducted by the printing system when the printing operation based on the stored data is completed, and the temperature conditioning operation or roller driving is automatically stopped, thereby, for example, power consumption is suppressed, deterioration of the apparatus is suppressed, and deterioration of the processing solutions can be suppressed when a print is formed by development-processing the photographic photosensitive material by using processing solutions.

(12) The above system stores the image data in the data storage means by conducting data compression processing when the amount of the image data to be stored in the data storage means exceeds a predetermined value.

In the above system, the image data is stored in the data storage means by being subjected to data compression processing when the amount of the image data to be stored in the data storage means exceeds a predetermined value, thereby, deterioration of the image quality due to the data compression is suppressed to the minimum, and more image data can be stored and printed, by the printing system.

(13) A printing system in which, in the first mode, image data and the corresponding information are obtained, and based on the information, the image data corresponding to the information is selected into the image data to be printed in the first mode and into the image data not to be printed in the first mode, and a print is formed based on the image data selected to be printed; and in the second mode, a print is formed based on the image data selected not to be printed in the first mode, wherein the above printing system outputs a command to change the present recording medium to a predetermined sized-recording medium to form a print based on the image data and the corresponding information, stored in the data storage means, when the mode is switched from the first mode to the second one.

The above system can require the replacement to the recording medium having the width capable of the maximum sized-printing which is necessary in the printing system when a print is formed based on the stored data, thereby, stoppage of printing operation due to discord of the size can be prevented.

(14) The above system forms a print by arranging the image onto a predetermined sized-recording medium so as to reduce a margin, based on the image data and the corresponding information, stored in the data storage means.

In the above printing system, when the image data is appropriately arranged on, for example, the recording medium having the large width, and the recording medium is cut to a predetermined size after the printing operation, even if the operator is not near the printing apparatus and the recording medium can not be changed to the recording medium having the different width, the amount of useless recording medium is reduced to the minimum, and various sized-prints can be formed.

(15) A printing system in which, in the first mode, the image data and the corresponding information are obtained, and based on the information, the image data corresponding to the information is selected into the image data to be printed in the first mode and into the image data not to be printed in the first mode, and a print is formed based on the image data selected to be printed; and in the second mode, a print is formed based on the image data selected not to be printed in the first mode, wherein the printing system has a release means by which, after the change of the mode from the first one to the second one, the printing operation based on the image data which is not printed in the first mode, and the corresponding information, which are stored in the data storage means, is stopped once and the mode is returned to the first mode.

In the above system, when, in the second mode, it is required to return to the first mode at once and to start again the printing operation 'in order-reception', the printing operation in the second mode is stopped once, and the mode is changed to the mode 'in order-reception' in the first mode and the print can be instantly formed. In this case, it is preferable for easy print control that the printing operation based on the stored data is stopped when the order is completed, rather than during the operation for each of customers.

BRIEF DESCRIPTION OF THE DRAWINGS

The objects and advantages of the present invention will become apparent upon reading the following detailed description and upon reference to the drawings in which.

DETAILED DESCRIPTION OF THE PREFERRED EMBODIMENT

Referring to the drawings, an example of a printing apparatus and a printing system of the present invention will be described below. Incidentally, a printing apparatus and a printing system, embodied in the present invention, are not limited to the present example.

Figure 1:
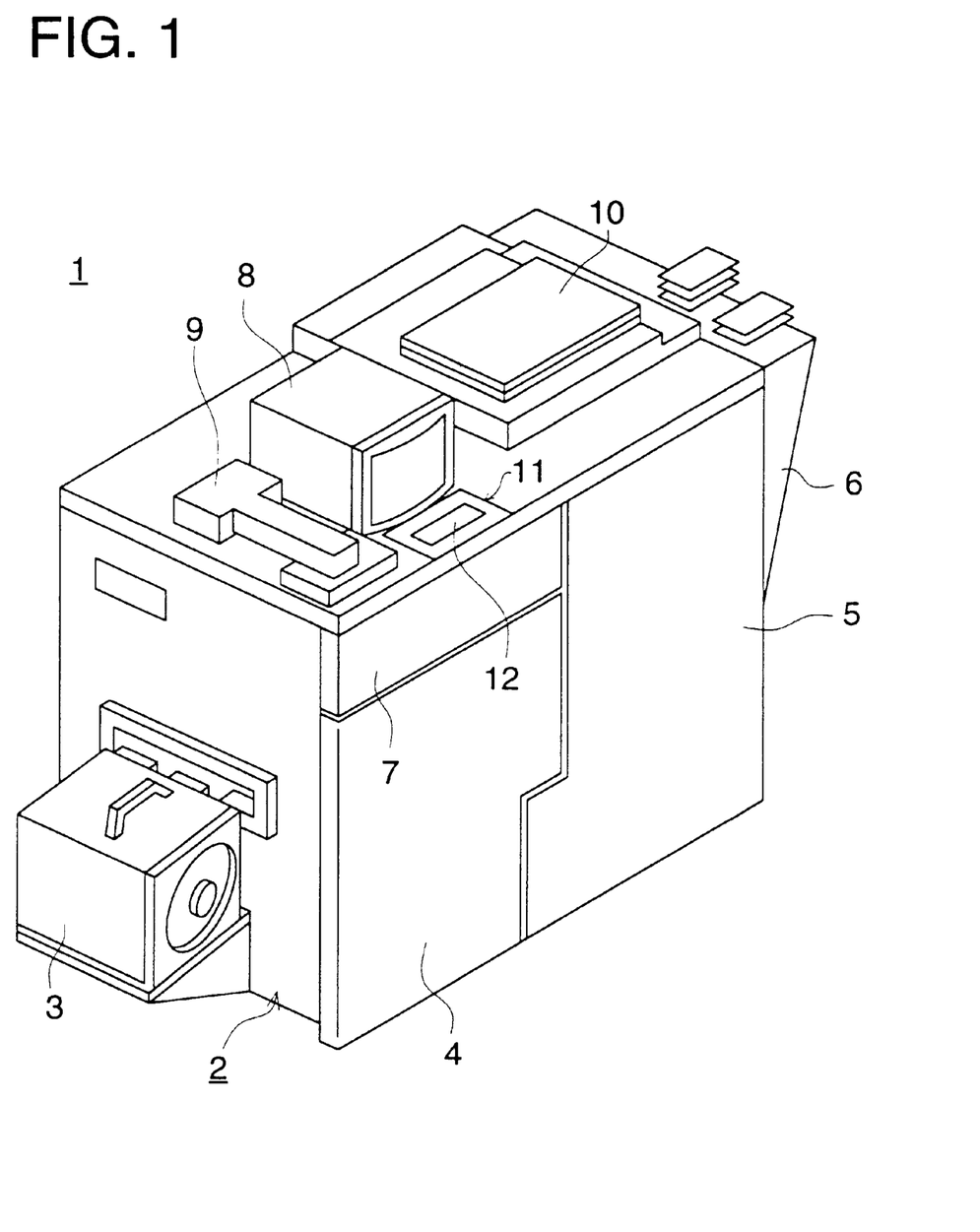
FIG. 1 is an overall perspective view of a printing apparatus.

FIG. 1 is an overall perspective view of a printing apparatus. Although an apparatus, which produces prints by exposing a photosensitive material with a light before development, is exemplified as a printing apparatus in the following, the scope of the present invention is not limited to this type of apparatus, but is applicable to any type of apparatus as far as the apparatus produces prints on the basis of the image data, for example, an inkjet type, or an electrophotographic type.

As shown in FIG. 1, a print producing apparatus 1 of the present example incorporates a magazine loading section 3 mounted on the left side of a main body 2, an exposure processing section provided in the main body 2 to expose images on photosensitive materials, and a development processing section 5 to produce the prints by developing the exposed photosensitive materials and drying them. The finished prints are delivered to a delivery tray 6 mounted on the right side of the main body 2. In addition, a control section 7 is also incorporated in the main body 2, and located at the upper portion of an exposure processing section 4.

Further, a CRT 8 is mounted on the top of the main body 2. A film scanner section 9 which reads image data of a transmission original film, and a reflective original sheet inputting device 10 (hereinafter, for simplicity, referred to as the inputting device 10) which reads image data of a reflective original sheet, are arranged at left and right sides of the CRT 8, respectively. An operation section 11 is located on the front side of the CRT 8, and an information inputting means 12 is provided on the operation section, and the information inputting means is structured of, e.g., a touch-panel, or the like.

Figure 2:
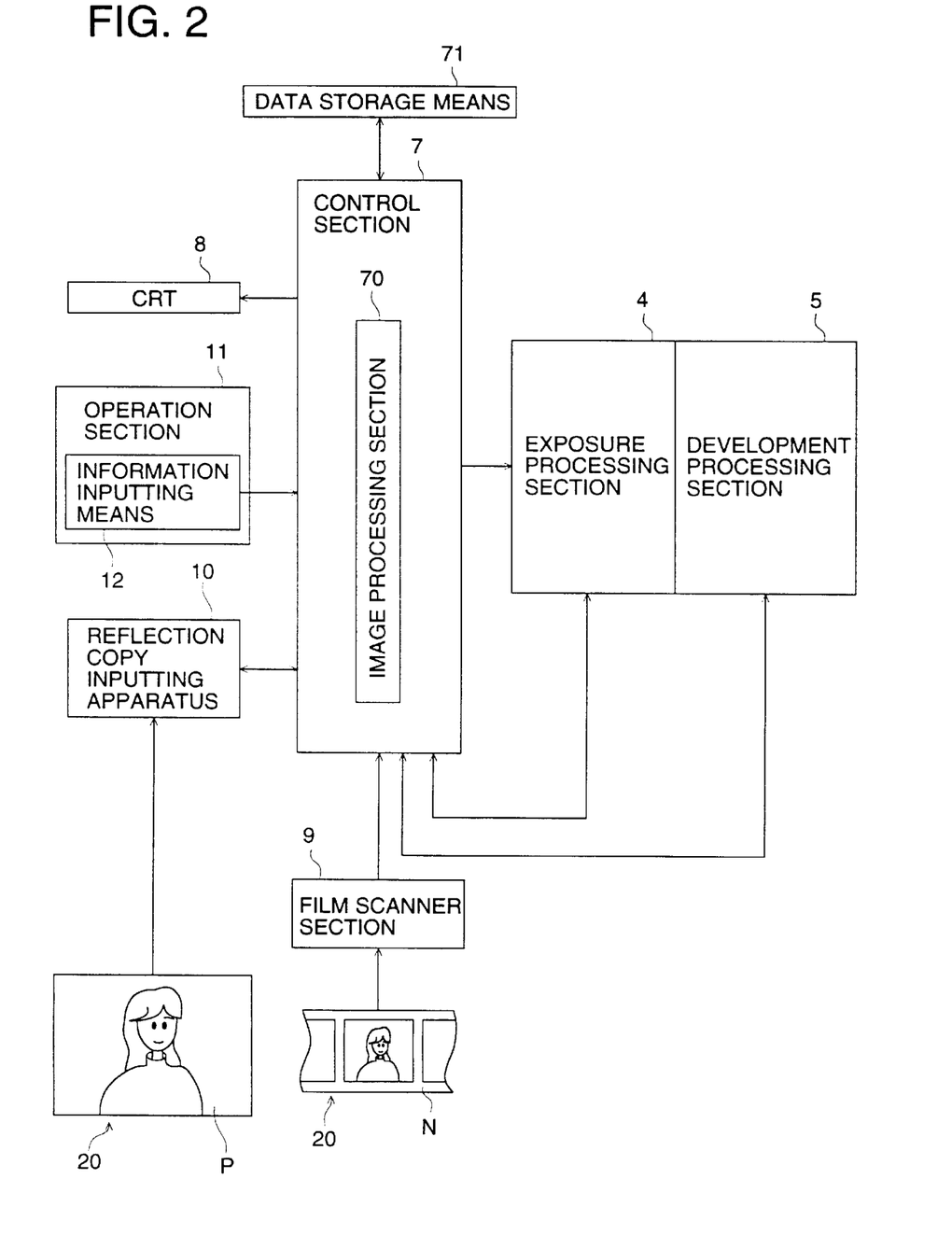
FIG. 2 is a schematic structural views of the printing apparatus.
Figure 3:
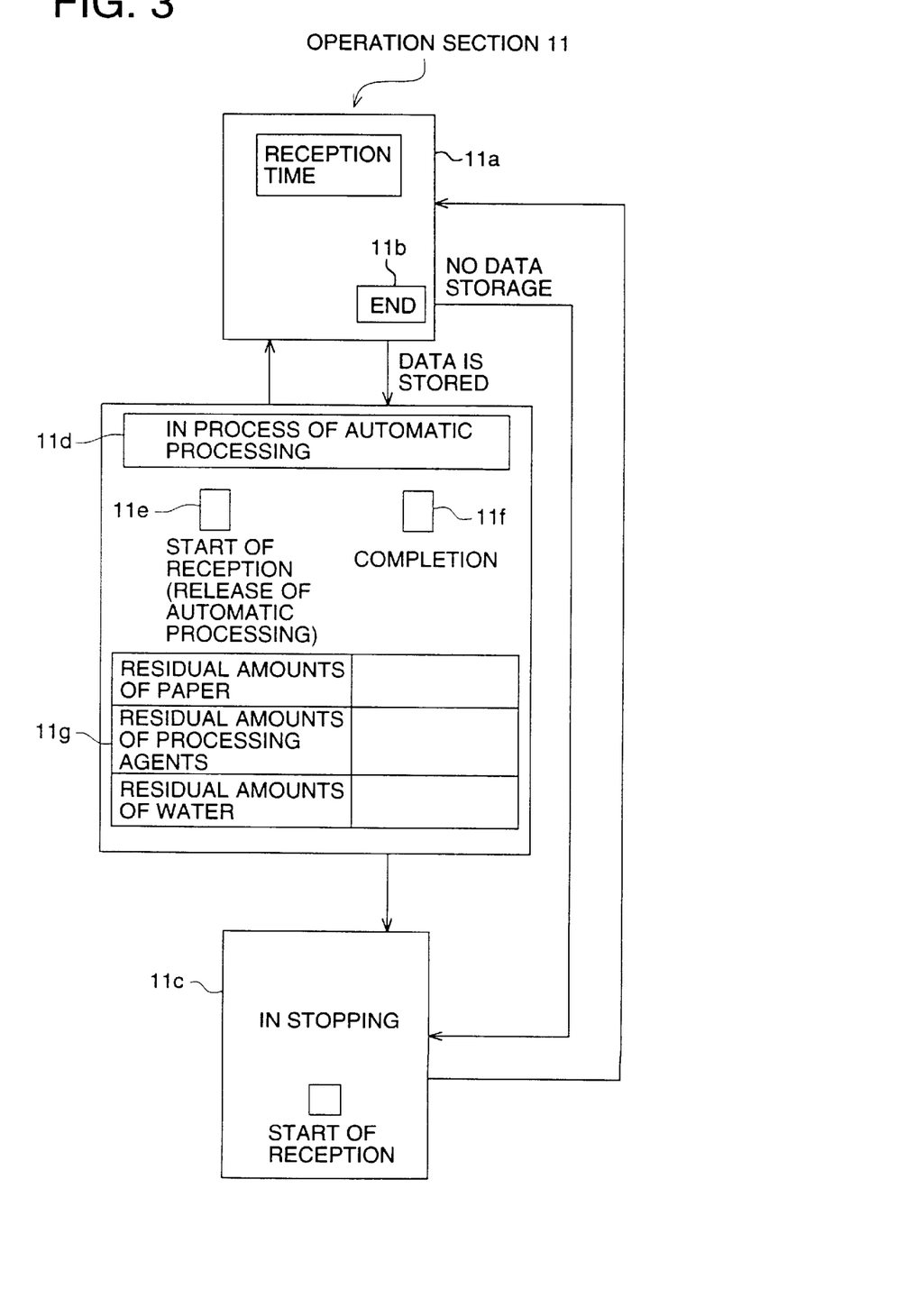
FIG. 3 is a view showing an operation screen when the status of a reception time and the status of an off-time of order reception is switched.

FIG. 2 is a schematic structural view of the printing apparatus. FIG. 3 is a view showing an operation screen when the status of 'in order reception' and the status of 'completion of order reception' is switched.

The control section 7 of the print producing apparatus 1 reads the original information from the film scanner section 9 or the inputting device 10 based on the commands from the information inputting means 11, and obtains the image data and displays it on the CRT 8. Further, the control section 7 has a data storage means 71, and stores the image data and the corresponding order information in the data storage means 71, and successively accumulates them.

Further, the control section 7 incorporates an image processing section 70. The image processing section 70 applies image processing to the image data to generate new image data for exposing operations, and sends the generated image data to the exposure processing section 4. In the exposure processing section 4, an image is exposed onto the photosensitive material, after that, which is sent to the development processing section 5, to be developed and dried. Thus prints are formed.

Next, the first example of the present invention will be described. In the first example, during the reception time when the customer's order is being received in a first mode, the print producing apparatus 1 selects either the image data to be produced promptly or the image data not to be produced promptly, after acquiring the image data and the information corresponding to the image data.

The information mentioned above includes order information based on the customer's requests and/or information based on the apparatus functions. The order information further includes the finishing date information designating either same-day delivery or next-day delivery, the paper type information designating a finished surface quality such as gloss or silk, the print size information (E-type, L-type, etc.), the print type information designating either a print bearing a single image or a print bearing a plurality of images arranged (laid out) on one sheet of paper, which requires special processing, etc. For the above information, the shop can previously set standards of selection for the printing operation corresponding to the type of services or convenience of the operation, and according to the standards, the printing operation can be conducted separately for the ordinary printing for main production, or for the special printing orders.

Incidentally, it is preferable that setting of the standards of selection can be changed corresponding to the convenience of the shop. Further, other than the above information, the information may include input information designating whether the objective image data can be processed either prior to the standard of selection or after the operation based on the standard of selection, based on the operator's instruction.

The information based on the apparatus functions includes printing information for sorting them into two categories such as information which enable the automatic color density adjustment of the image data through arithmetic processing and information which hardly enable the automatic color density adjustment and requires some manual operations for the color density adjustment. The image data of the former category are temporarily stored in the memory to collectively print them in the second mode.

The information is inputted by the information inputting means 12, and then, the image data and the information corresponding to the image data are obtained.

In the control section 7, based on the information, the image data are classified into either image data to be printed promptly or image data to be printed collectively. The above classification may include, e.g., prints for the next-day delivery, special prints taking longer time, prints being processed by the automatic color density adjustment, etc. Further, it is also allowable to classify the image data by a predetermined priority order of widths, surface qualities, etc. of the recording mediums to control printing.

During the reception time of the customer's orders in the first mode, the printing apparatus will produce prints based on the image data classified into the image data to be printed promptly, while it stores the image data and the information corresponding to the image data classified into the image data to be printed collectively, in the data storage means 71. During the off-time of customer's orders in the second mode, the printing apparatus produces prints based on the image data and the information corresponding to the image data stored in the data storage means 71.

Changeover between the reception time and the off-time of customer's orders is achieved as shown in FIG. 3. Specifically, the printing apparatus produces prints based on the image data classified into the image data to be printed promptly, which are displayed on the screen 11a for the reception time, while it stores the image data and the information corresponding to the image data, classified into the image data to be printed collectively, in the data storage means 71.

After the finalization of prints production during the reception time, when an end button 11b on the screen 11a for the reception time is pushed, the screen is changed to the screen 11c for 'in stopping' in case no data are stored in the data storage means 71, and the printing apparatus 1 is automatically stopped completely.

In case that some data are stored in the data storage means 71, the screen is changed to the screen 11d of 'in process of the automatic processing' on which 'a start of reception' (release of automatic processing) button 11e and a completion button 11f are provided.

After the finalization of the reception time, by pushing 'the start of reception' (release of automatic processing) button 11e on the screen 11d for 'in process of the automatic processing', the printing apparatus 1 starts producing prints based on the image data and the information corresponding to the image data, which are stored in the data storage means 71 and not printed during the reception time. While, by pushing the completion button 11f, the screen is changed to the 'in stopping' screen 11c, and the printing apparatus 1 is completely stopped, along with the associated temperature conditioner, driving rollers, etc.

In regard to a changeover method between the reception time and the off-time of customer's orders, the following methods can be employed: a timer setting method by which both modes are switched at a predetermined time; a method in which the printing mode is switched in case a new printing operation is not started, after passage of a predetermined time period.

The control section 7 includes a releasing means by which the print production operation based on the stored data can be temporarily interrupted and the printing apparatus 1 can enter the status of the reception time, by pushing 'the start of reception' (release of automatic processing) button 11e on the screen 11d for 'in process of the automatic processing' during the operation of the automatic print production mode. Accordingly, it becomes possible to promptly switch to the reception status of printing order and to start that print production sequence, even if the printing apparatus 1 is producing prints based on the image data stored in the memory after the finalization of the reception time.

Figure 4:
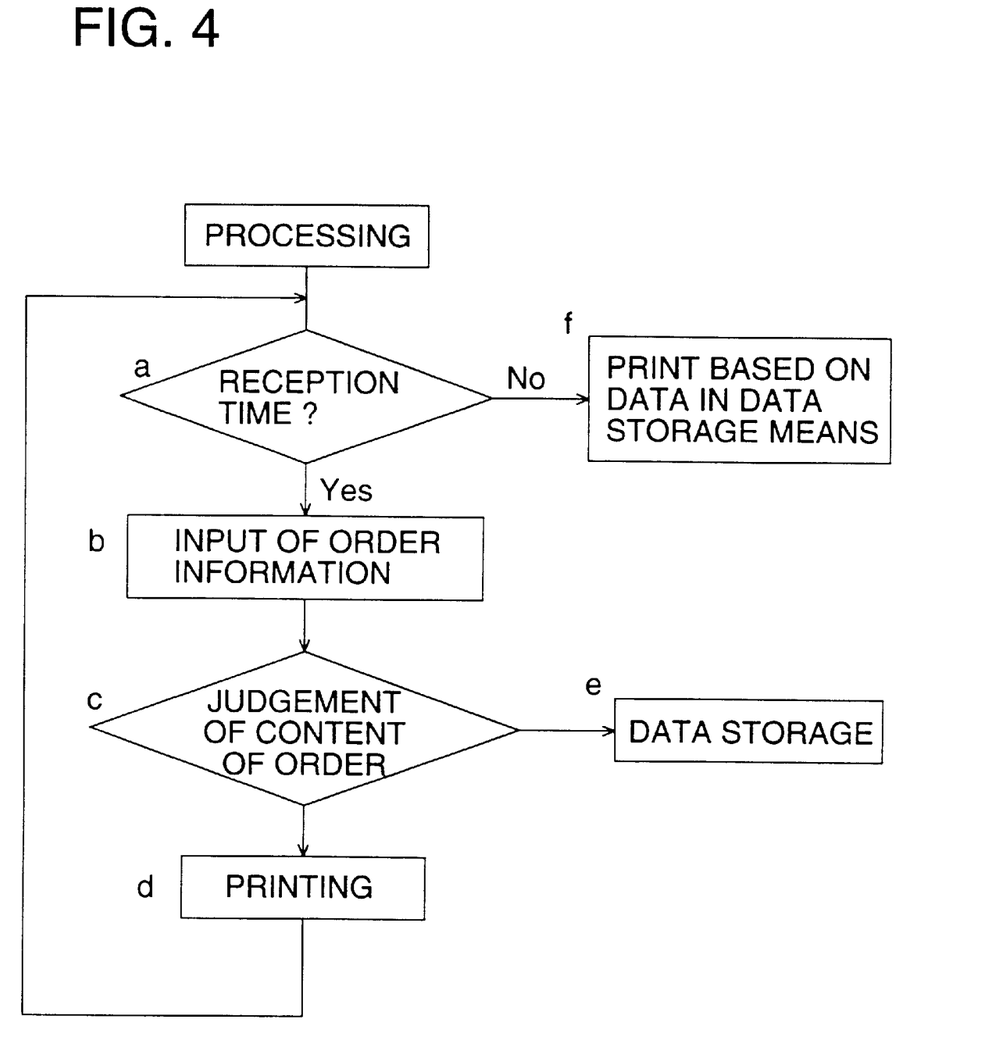
FIG. 4 is a flow chart showing the control of a control section.

FIG. 4 shows a flow chart of an order information processing sequence in the control section 7.

Initially, the control section 7 judges whether the present status is the reception time of customer's order or not (step 'a'). When the present status is the reception time, the order information is inputted by the operator or by reading information (step 'b'). The control section 7 classifies the inputted order information into either the image data to be printed promptly or the image data to be printed collectively, by judging from the contents of the inputted order information (step 'c'). The printing apparatus produces prints based on the image data classified to be printed promptly (step 'd'). In regard to the image data classified to be printed collectively, the image data and the order information corresponding to the image data are stored in the data storage means 71 (step 'e'). When the print production in step 'd' is completed, the control section 7 returns to step 'a'.

When the control section 7 judges that the present status is not the reception time, but is the off-time of the reception, the printing apparatus 1 starts producing prints based on the image data and the information corresponding to the image data, which are stored in the data storage means 71 and were not printed during the reception time (step 'f'). When no image data and no information corresponding to the image data are stored in the data storage means 71, the flow chart ends as it is.

Figure 5:
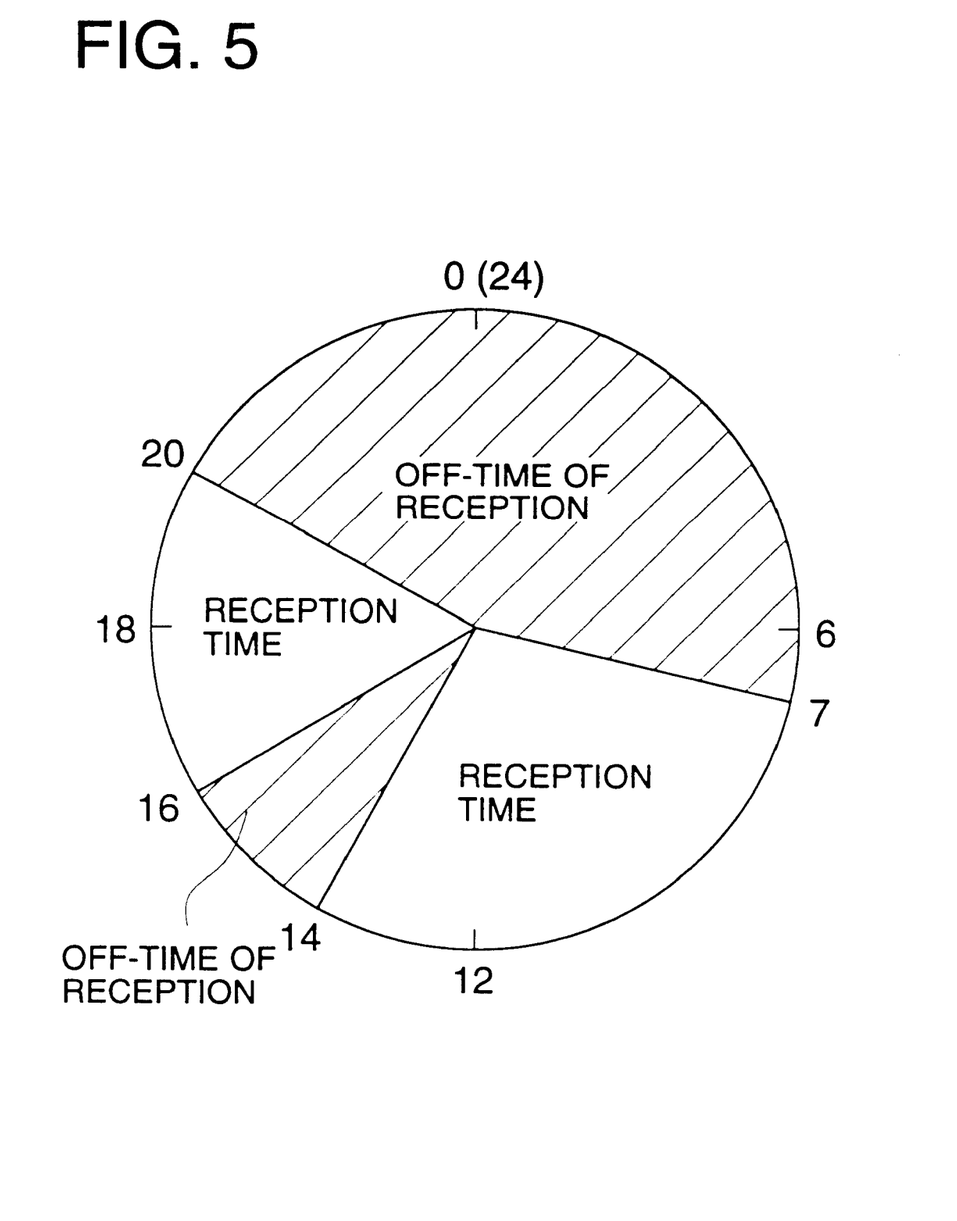
FIG. 5 is a view showing a concrete example of the reception time.

FIG. 5 is a view of an example concretely showing the case where the reception time is switched by timer setting. For example, in a photofinishing lab, a so-called mini-lab, in which the printing apparatus 1 is installed, the reception time starts at 7 o'clock in the morning. In the reception time, corresponding to the customer's order, the ordinary printing operation is carried out by the operator, and formed prints are delivered in very short time to the customer. In a noon recess from 14:00 to 16:00, the operation mode is switched to the off-time mode, and printing is carried out without any operator during the noon recess, based on the image data and the order information corresponding to the image data, which are stored in the data storage means 71 and were not printed during the reception time.

When it is 16:00, the operation mode is switched from the off-time mode to the reception time mode, and the ordinary printing operation is carried out until 20:00 by the operator corresponding to the customer orders, and thus formed prints are again delivered to the customer in a very short time. The printing operation of the day is completed at 20:00, and the operation mode is switched to the off-time mode. From 20:00 to 7:00, the printing operation is carried out based on the image data and the order information corresponding to the image data, which are stored in the data storage means 71 and were not printed during the reception time.

As described above, the printing apparatus can be separately used as follows: the ordinary printing operation is carried out by the operator during the reception time of the day, in which a printing service to deliver the prints to the customer in very short time is carried out; and for example, during an operator's off-duty time or midnight, the printing operation based on image processing, requiring a long time period, is carried out without any operator present in the lab, and an overnight printing service is carried out. Accordingly, the printing apparatus can be more efficiently used, resulting in an increase of efficiency of the printing operation. Further, since the printing operation can be carried out in a time period of low power consumption by using the midnight energy, a power voltage would be more stable and the energy cost for power dissipation would be reduced.

Further, e.g., since the ordinary printing operations and the special printing operations can be separately carried out, it becomes possible to reduce the frequency for replacing the recording medium between ordinary printing needs and special printing needs, e.g., larger widths. Specifically, it becomes possible to minimize the loss of the photographic paper, serving as photosensitive material, exhibited by photographic fog which occurs on the leading edges of the newly replaced photographic paper.

Next, the second example of the present invention will be described. In this example, the printing apparatus is an apparatus in which the image data and the corresponding information are obtained, the image data and the corresponding information are stored in the data storage means 71, and a print is formed based on the image data and the corresponding information, stored in the data storage means 71, and the apparatus is controlled by comparing the stored data to at least one of several factors, which are necessary for printing, such as the amount of recording medium, the amount of processing agents for recording medium, and the amount of water.

In the printing apparatus 1, the printing operation can be carried out without any operator, e.g., during the operator's rest time or midnight, therefore, when any of the photosensitive material, processing agents to process the photosensitive material, and water is insufficient, a print can not be formed, or a print of the predetermined image quality can not be formed.

Therefore, the remaining amount of processing agents, the remaining amount of water and the remaining amount of photosensitive material are checked during the printing operation, and the amount of processing agents, the amount of water, and the amount of photosensitive material, which are necessary for printing based on the image data and the corresponding information, stored in the data storage means 71, are compared to the amount of processing agents, the amount of water, and the amount of photosensitive material during printing, and print-controlled. For example, when the amount of processing agents, the amount of water, and the amount of photosensitive material are insufficient, for example, insufficient amounts of processing agents, water, and photosensitive material are displayed on a display section 11g arranged on the screen 11d of 'in process of automatic processing' of the operation section 11, and the replenishment is requested so that insufficiency does not occur during printing.

Further, when the amount of processing agents, the amount of water, and the amount of photosensitive material are insufficient during printing, printing processing can be stopped, so that a print with an unacceptable image is not formed.

Next, the third example of the present invention will be described. In this example, the printing apparatus is one in which the image data and the corresponding information are obtained, the image data and the corresponding information are stored in the data storage means 71, and a print is formed based on the image data and the corresponding information, which had been stored in the data storage means 71, and when printing based on the stored data has been completed, the apparatus control is carried out.

In the printing apparatus 1, the printing operation can also be conducted without any operator being present, therefore, when printing operation is completed, the control section 7 carries out the completion control based on the completion of printing, and the screen is automatically switched to the screen 11c of 'in stopping', and then the printing apparatus 1 is completely stopped.

As described above, when printing based on the stored data is completed, the control section 7 conducts the completion control of the printing apparatus itself, and the temperature conditioning operation and driving of rollers are automatically stopped. Thereby, e.g., power consumption is suppressed, deterioration of the apparatus is suppressed, and in the apparatus in which photographic photosensitive material is developed by using processing solutions to form a print, the processing solution is prevented from being deteriorated.

In the first to third examples of the present invention, when the amount of image data to be stored in the data storage means 71 exceeds a predetermined value, the control section 7 applies image compression processing to the image data and stores the compressed image data in the data storage means 71. Accordingly, it becomes possible to produce many prints with little deterioration of the image quality due to the image compression processing by storing a large amount of the compressed image data.

Further, the control section 7 outputs the replacement command to replace the existing recording medium to a predetermined sized recording medium to form prints, based on the image data and the corresponding information, stored in the data storage means 71, after the finalization of the reception time. When prints are formed based on the image data and the corresponding information, stored in the data storage means 71, printing operation is conducted without any operator, therefore, the control section 7 outputs a command to install a roll-like photosensitive material having the large width on which, e.g., the largest print can be formed. Accordingly, the replacement to the recording medium having the necessary width for the maximum sized print to be formed, can be required, wherein the maximum sized print is necessary when printing is conducted based on the stored data, thereby, printing will not be stopped due to inadequate sheet sizes.

Figure 6:
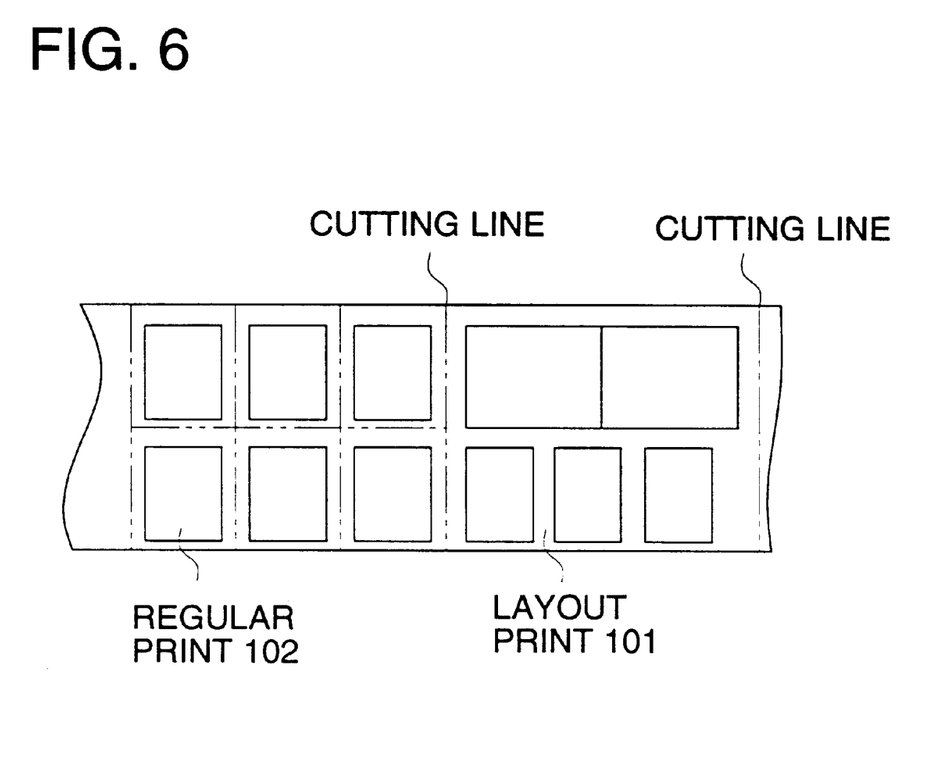
FIG. 6 is a view showing a situation in which the image data is arranged and a print is formed.

Further, the image data are arranged as shown in FIG. 6, and prints are formed corresponding to the photosensitive material, which is a recording medium, based on the image data and the corresponding order information, stored in the data storage means 71. For example, the image data are appropriately arranged on the photosensitive material, which is a recording medium of a larger width, and a layout print 101 is formed, or after the ordinary print 102 is formed, the print 102 is cut into a predetermined print size, thereby, various sized prints can be formed. Alternatively, for example, the photosensitive material, which is a recording medium of a larger width, is previously cut into a predetermined size and the image data are appropriately arranged thereon, and a layout print 101 is formed, or the photosensitive material is cut into a predetermined size again, thereby, the ordinary print 102 can be formed.

Figure 8:
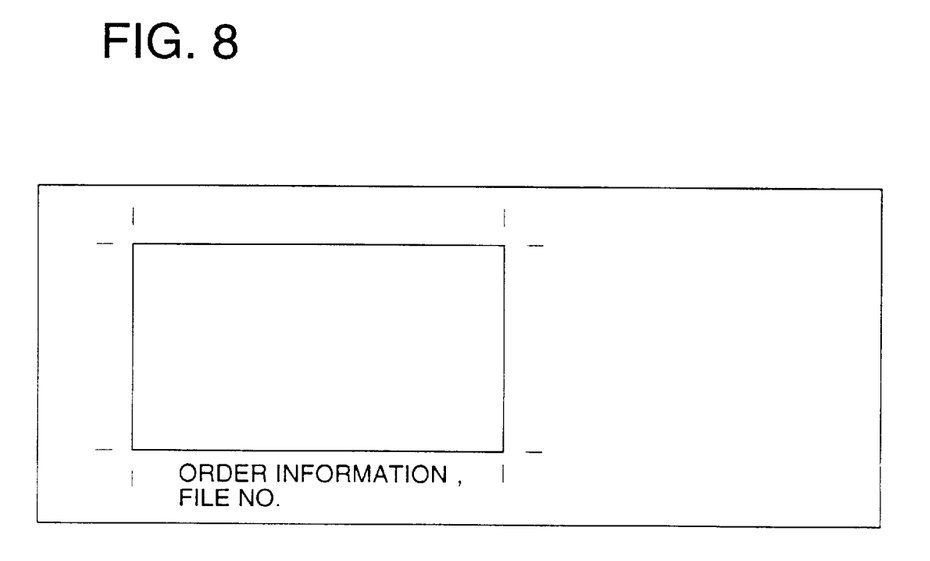
FIG. 8 is a view showing an example of a cut-mark and a print of the order information.

In this case, it is preferable that, considering the future cut of the print thereafter, a cut mark indicating the cut position as shown in FIG. 8 is provided; or information to specify the image, order information, frame number of the film, file name of the image data, or the like, be located at a proximate locations which does not come into contact with the image, and the images are printed.

Further, considering that the print will be cut later, as a method to arrange images on the photosensitive material for optimal utilization of the print material, the following are applicable:

Initially, the information concerning the width of the photosensitive material to be printed, and the information concerning the first print size in the order information are obtained.

Next, information concerning the size of a second print existing in the same order or the next order, which is different from the first print size, is obtained.

The longitudinal lengths and lateral lengths of the first and second print sizes are compared to the width of the photosensitive material, and a combination in which the margin is the minimum, is determined, thereby, the width of the first print and the width of the second print are determined. (For example, a combination of the longitudinal length of the first print size and the lateral length of the second print size is selected, or a combination of the longitudinal length of the first print size and the longitudinal length of the second print size is selected, or the like.)

After the above determination, the image data having the print size printable with the first print width is arranged in the longitudinal direction of the photosensitive material, and the image data having the print size printable with the second print width is arranged in the longitudinal direction of the photosensitive material, and then, a print is formed.

Thereby, at least, the cutting operation in the direction of the width becomes easier, and efficiency of the use of the photosensitive material can be increased.

Incidentally, in the above example, two print sizes are combined in the direction of width, however, three or more print sizes may be also combined.

In the off-time of customer's order, the printing operation can be conducted without any operator's attention. Accordingly, as shown in FIG. 1, prints are delivered in piles on the tray 6, however, it is presumed that the number of piled prints is increased. Therefore, the drying power of the drying means provided in the development processing section 5 is boosted up, thereby, it is desirably avoided that prints are adhered to each other by the piling pressure.

Further, it is presumed that the number of customer order units will increase, therefore, the tray 6 may be replaced with a larger sized sorter. Prints are sorted into customer order units by the large sized sorter, but it may also be replaced with the following: an order separation print is made and inserted into each order section so that an order division is clearly confirmed; further, the order information is back printed onto the print so that an order division is clearly confirmed, and the order information corresponds with bar-codes on a negative film or an order bag, thereby, prints can be assuredly returned to the customer.

Further, the control section 7 observes the processing situation of the exposure processing section 4 or development processing section 5, and has a means to notify the operator when abnormal voltage fluctuation, generation of the power supply noise, or conveyance failure of the photosensitive material is caused, or a means to stop the apparatus at the abnormal occurrence. As a means to notify the operator of the abnormal situation, an abnormality display on the operation section 11, a buzzer alarm, and a facsimile, a telephone, inter-net, and a pocket bell, or the like, are available. Further, a means to stop the apparatus during abnormal situations stops the printing apparatus 1 when jamming of the photosensitive material on the conveyance path is detected.

Further, the control section 7 monitors the processing sequences of the exposure processing section 4 or the development processing section 5, and stores information to specify a print having the possibility to affect the image quality due to an abnormality of the apparatus. Accordingly, during abnormal situations, specifically when the abnormality having a possibility to affect the image quality at the time of occurrence of voltage fluctuation or the power supply noise, is generated, a designation to check the existence or not of a print error can be outputted, and for example, a designation to visually confirm the print of 25-th order because it may be abnormal, is displayed on the operation section 11.

Figure 7:
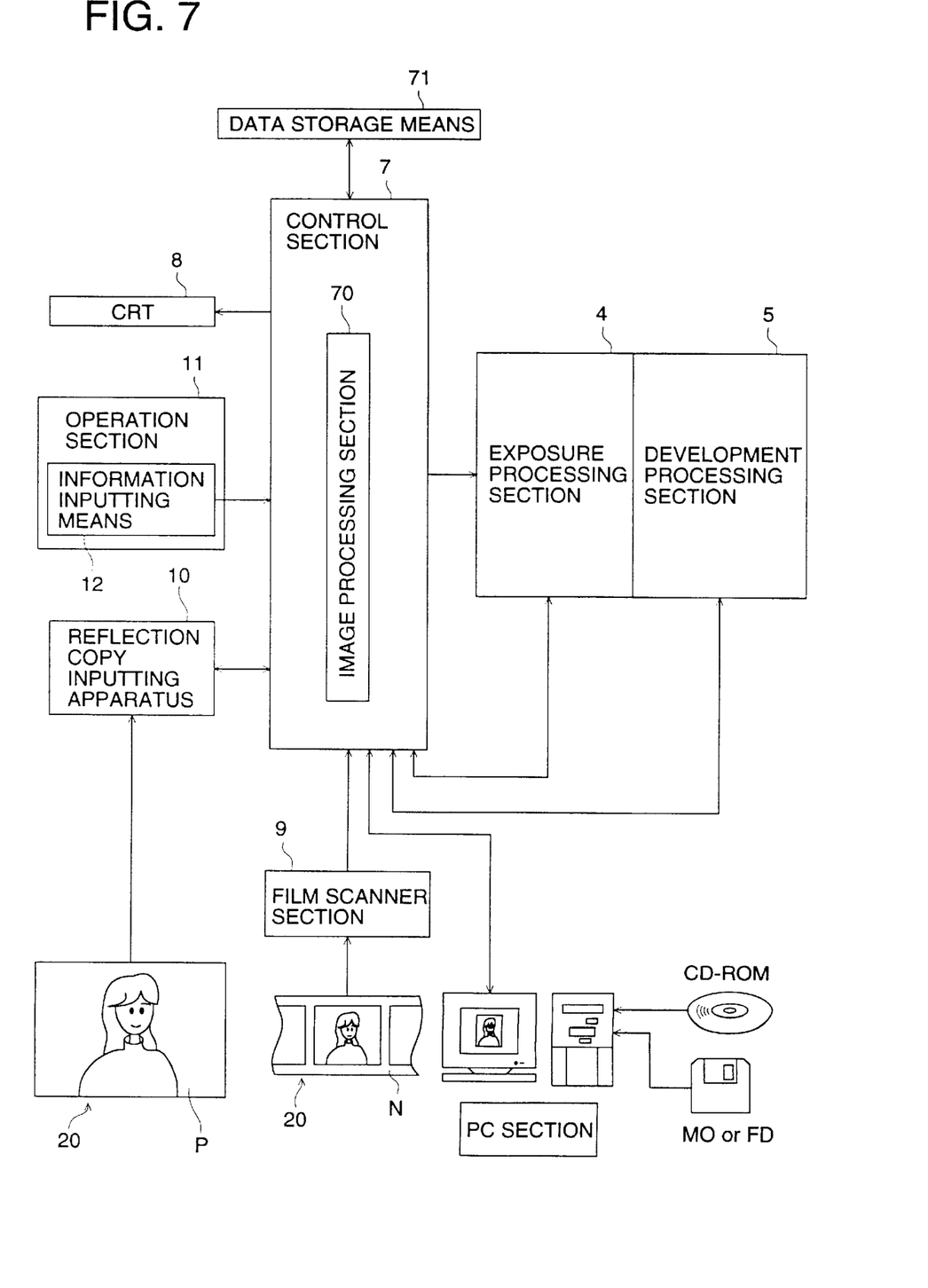
FIG. 7 is a schematic structural views of the printing apparatus connecting with the personal computer section.

In the example shown in FIG. 7, in addition to the structure shown in FIG. 2, a structure in which a personal computer (PC section) placed on the market, is connected to the control section 7 by the data communication, is shown, and a system is also shown in which, in the PC section, the image is read from media such as a CD-ROM or MO, FD, in which the image data is stored, and the image data is formed by being subjected to image processing such as image synthesis or image conversion, or the image data is directly sent to the control section 7 together with the order information including print size information, without being subjected to image processing.

Herein, when print requests from the PC section are sorted and all of the sorted requests are set to be printed later, the control section 7 is structured as follows: even if the image data and order information are ready and the print request is outputted from the PC section, it is not necessary that the operator interrupts the ordinary printing operation such as printing using a film scanner, and the situation of the apparatus may be switched at timing desirable for the operator, and printing can be conducted based on the image data from the PC section.

Further, the PC section may also be structured to have a function to sort the information into a request to be printed at present, and a request to be printed later, depending on the information.

Further, the above-described data storage means 71 may be provided in the PC section, and further the information of the amount of processing agents, water, and the photosensitive material may be displayed on a monitor display in the PC section.

According to the present invention, in the first mode, image data and the corresponding information are obtained, and based on the information, the image data corresponding to the information is selected into the image data to be printed in the first mode and into the image data not to be printed in the first mode, and a print is formed based on the image data selected to be printed; and in the second mode, a print is formed based on the image data selected not to be printed in the first mode. Accordingly, for example, in the daytime, as the first mode, the ordinary printing operation is mainly carried out by the operator, and a printing service to deliver the print to the customer in very short time is carried out; and for example, during a rest of the operator or night, as the second mode, the special printing operation based on image processing, requiring a long time period, is carried out without any operator, and thereby, the printing apparatus can be separately used in such a manner that this day delivery printing service and an overnight printing service are separately carried out. Accordingly, the printing apparatus can be effectively used, resulting in an increase of efficiency of the printing operation. Further, the printing operation is mainly carried out in a time period of low power consumption, and low energy charge, and further, voltage is stable and the printing cost is also lowered.

Further, for example, the ordinary printing and the special printing can be separately conducted, therefore, the number of replacement of the recording medium having the width for the ordinary print and the recording medium having, for example, the large width for the special print is reduced, and the useless consumption of sheets of paper due to photographic fog specifically generated on the leading edge of the photosensitive material photographic paper, which is recording medium, can be suppressed to the minimum.

Time periods of the first mode and the second mode are previously set, and for example, switching of the 'in order reception' of the first mode and the 'completion of order reception' of the second mode is automatically carried out by timer setting, or the like, which is convenient.

The first mode is a mode of 'in order reception' and the second mode is a mode of 'completion of order reception', and the printing apparatus can be effectively operated corresponding to modes of use of the printing apparatus and print service modes, and for example, when the printing apparatus is operated during a rest of the operator or night, the apparatus can be operated in a time period of low power consumption and low energy charge, thereby, voltage is stable and low cost printing can be attained.

When the printing operation is started based on the image data and the corresponding information, which are stored in the data storage means, a necessary amount of recording medium, a necessary amount of processing agents for processing the recording medium to form the print, and a necessary amount of water are presumed from the stored data, and when any of these amounts is insufficient, replenishment is previously requested, or it is reported that to which extent the printing operation will be completed without any replenishment, thereby, a shortage of such the amount can be avoided during printing operation. After the printing operation is started, the printing operation can be controlled to be stopped when any of the above amounts becomes short, thereby, printing paper is prevented from being uselessly printed. In this case, it can also be reported based on the stored data, to what extent the printing operation is not completed.

The completion of the printing apparatus itself is also controlled when the printing operation based on the stored data is completed, and the temperature conditioning operation or roller driving is automatically stopped, thereby, for example, power consumption is suppressed, deterioration of the apparatus is suppressed, and deterioration of the processing solutions can be suppressed when a print is formed by development-processing the photographic photosensitive material by using processing solutions.

The data is stored in the data storage means by being subjected to data compression processing when the amount of the image data to be stored in the data storage means exceeds a predetermined value, thereby, deterioration of the image quality due to the data compression is suppressed to the minimum, and more image data can be stored and printed.

When the mode is switched from the first mode to the second one, a command to change the present recording medium to a predetermined sized-recording medium to form a print is outputted based on the image data and the corresponding information, which are stored in the data storage means, thereby, the replacement to the recording medium, which has the width printable in the maximum size necessary when a print is formed based on the stored data, can be requested, thereby, stoppage of the printing operation due to discord of the size can be prevented.

A print is for med by arranging the image onto a predetermined sized-recording medium so as to reduce a margin, based on the image data and the corresponding information, which are stored in the data storage means, thereby, when the image data is appropriately arranged on, for example, the recording medium having the large width, and the recording medium is cut to a predetermined size after the printing operation, even if the operator is not near the printing apparatus and the recording medium can not be changed to the recording medium having the different width, the amount of useless recording medium is reduced to the minimum, and various sized-prints can be formed.

In the second mode, when it is required to return to the first mode and to start again the printing operation 'in order-reception', the printing operation in the second mode is stopped once, and the situation is changed to the mode 'in order-reception' in the first mode and the print can be instantly formed. In this case, it is preferable for easy print control that the printing operation based on the stored data is stopped when the order is completed, rather than during the operation for a unit of customers.

By the printing system, when the printing operation is started based on the image data and the corresponding information, which are stored in the data storage means, a necessary amount of recording medium, a necessary amount of processing agents for processing the recording medium to form the print, and a necessary amount of water are presumed from the stored data, and when any of these amounts is insufficient, replenishment is previously requested, or it is reported that to which extent the printing operation will be completed without any replenishment, thereby, a shortage of such the amount can be avoided during printing operation. After the printing operation is started, the printing operation can be controlled so as to be stopped when any of the above amounts actually becomes short, thereby, printing paper is prevented from being uselessly printed. In this case, it can also be reported based on the stored data, to what extent the printing operation is not completed.

By the printing system, the completion of the printing apparatus itself is also controlled when the printing operation based on the stored data is completed, and the temperature conditioning operation or roller driving is automatically stopped, thereby, for example, power consumption is suppressed, deterioration of the apparatus is suppressed, and deterioration of the processing solutions can be suppressed when a print is formed by development-processing the photographic photosensitive material by using processing solutions.

By the printing system, the image data is stored in the data storage means by being subjected to data compression processing when the amount of the image data to be stored in the data storage means exceeds a predetermined value, thereby, deterioration of the image quality due to the data compression is suppressed to the minimum, and more image data can be stored and printed.

In the printing system, the replacement to the recording medium, which has the width printable in the maximum size necessary when a print is formed based on the stored data, can be requested, thereby, stoppage of the printing operation due to discord of the size can be prevented.

In the printing system, when the image data is appropriately arranged on, for example, the recording medium having the large width, and the recording medium is cut to a predetermined size after the printing operation, even if the operator is not near the printing apparatus and the recording medium can not be changed to the recording medium having the different width, the amount of useless recording medium is reduced to the minimum, and various sized-prints can be formed.

By the printing system, in the second mode, when it is required to return to the first mode at once and to start again the printing operation 'in order-reception', the printing operation in the second mode is stopped once, and the situation is changed to the mode 'in order-reception' in the first mode and the print can be instantly formed. In this case, it is preferable for easy print control that the printing operation based on the stored data is stopped when the order is completed, rather than during the operation for a unit of customers.

What is claimed is:

1. An apparatus for producing photographic prints based on specifications ordered by customers, comprising:

an inputting section to input image data and associate data relevant to said image data, based on said specifications ordered by said customers, wherein said associate data include data of said specifications, and each of said associate data corresponds to at least one of said image data in a unit of each customer;

a classifying section to classify said image data and said associate data into a first group for producing said photographic prints in a real-time and a second group for producing said photographic prints in an after-time, based on said data of said specifications included in said associate data;

a first memory to store said image data classified in said second group;

a second memory to store said associate data classified in said second group;

an image forming section to form images on a recording medium, based on said image data and said associate data; and a controlling section to control a print producing process of said apparatus in either a first mode, in which said apparatus real-timely produces said photographic prints based on said image data and said associate data classified in said first group, or a second mode, in which said apparatus collectively produces said photographic prints based on said image data and said associate data classified in said second group, data of which are stored in said first memory and said second memory, wherein an operating time of said apparatus is divided into a first operating time and a second operating time, which are not overlapping of each other, and during said first operating time, said controlling section controls said print producing process of said apparatus in said first mode, while during said second operating time, said controlling section controls said print producing process of said apparatus in said second mode.

2. The apparatus of claim 1, further comprising:

a selecting section to automatically and/or manually select either said first operating time or said second operating time, based on a command signal inputted by an operator.

3. The apparatus of claim 2, wherein said selecting section selects either said first operating time or said second operating time, based on a predetermined time-sharing schedule.

4. The apparatus of claim 1, wherein said inputting section inputs said image data and said associate data only during said first operating time.

5. The apparatus of claim 4, wherein said controlling section can temporarily stop said print producing process in said second operating time.

6. The apparatus of claim 4, wherein said controlling section determines a cutting position of said photosensitive material, based on said associate data and size data relevant to said photosensitive material, and controls said image forming section so as to form a cutting position mark at said cutting position on said photosensitive material.

7. The apparatus of claim 2, wherein said apparatus is enabled to accept said specifications ordered by said customers in said first operating time, while said apparatus is disabled to accept said specifications ordered by said customers in said second operating time.

8. The apparatus of claim 1, further comprising:

an image compressor to generate compressed image data by applying image compression processing onto said image data, when a total amount of said image data, classified in said second group, exceeds a predetermined capacity of said first memory.

9. The apparatus of claim 1, wherein, when said apparatus shifts to said second operating time from said first operating time, said controlling section generates a command signal for changing said photosensitive material to one having a size suited for producing said photographic prints based on said image data and said associate data stored in said first memory and said second memory.

10. The apparatus of claim 1, wherein said controlling section determines a layout of said images to be arranged on said photosensitive material, based on said image data and said associate data.

11. The apparatus of claim 10, wherein said controlling section determines said layout, so as to reduce a blank area of said photosensitive material, based on said image data and said associate data.

12. The apparatus of claim 1, further comprising:

a signal generator for outputting a signal when said image forming section finishes forming said images from said image data stored in said first memory, wherein said controlling section controls said print producing process based on said signal.

13. The apparatus of claim 1, further comprising:

a layout device for determining a layout of said images to be arranged on said photosensitive material, based on a plurality of said image data.

14. The apparatus of claim 1, wherein the recording medium comprises photosensitive material.

15. The apparatus of claim 14, wherein said controlling section performs a determining operation for determining whether or not at least one of factors including an amount of said photosensitive material, an amount of processing agents, and an amount of water, each of which is stored in said apparatus to produce said photographic prints, complies with a demand for producing said photographic prints from data stored in at least one of the memories, wherein said controlling section controls said image forming section based on a result of said determining operation.

* * * * *